US008731030B1

(12) United States Patent  
McDonald et al.

(10) Patent No.: US 8,731,030 B1  
(45) Date of Patent: May 20, 2014

(54) TRANSMISSION SYSTEM OF DIGITAL RADIO INFORMATION USING REPEATERS WHILE MINIMIZING DATA TRANSFER LATENCY

(75) Inventors: Patric Wood McDonald, Granite Bay, CA (US); Charles Wayne Bowman, San Diego, CA (US)

(73) Assignee: Remec Broadband Wireless LLC, San Diego, CA (US)

( * ) Notice: Subject to any disclaimer, the term of this patent is extended or adjusted under 35 U.S.C. 154(b) by 158 days.

(21) Appl. No.: 13/425,403

(22) Filed: Mar. 20, 2012

(51) Int. Cl.
*H04B 3/36* (2006.01)
*H04B 7/17* (2006.01)
*H04B 17/02* (2006.01)
*H04L 25/20* (2006.01)
*H04L 25/52* (2006.01)

(52) U.S. Cl.
USPC .............................................. 375/211; 455/7

(58) Field of Classification Search
USPC ........................................................ 375/211
See application file for complete search history.

(56) References Cited

U.S. PATENT DOCUMENTS

| | | | |
|---|---|---|---|
| 6,377,612 B1* | 4/2002 | Baker | 375/141 |
| 6,625,116 B1 | 9/2003 | Schneider et al. | |
| 7,283,548 B2 | 10/2007 | Denninghoff | |
| 7,536,167 B2 | 5/2009 | Gollnick et al. | |
| 7,558,557 B1 | 7/2009 | Gollnick et al. | |
| 7,826,818 B2 | 11/2010 | Gollnick et al. | |
| 7,873,343 B2 | 1/2011 | Gollnick et al. | |
| 2002/0109585 A1* | 8/2002 | Sanderson | 340/310.01 |
| 2003/0048525 A1* | 3/2003 | Irie | 359/337.1 |
| 2006/0079198 A1* | 4/2006 | Sanderson | 455/402 |
| 2012/0315894 A1* | 12/2012 | Dussmann | 455/424 |

* cited by examiner

*Primary Examiner* — Erin File
(74) *Attorney, Agent, or Firm* — Boris G. Tankhilevich

(57) ABSTRACT

The method for transmission a set of digital data is provided. The method comprises: (A) processing a received signal transmitted from a preceding site by at least one repeater located in a repeater hub in a processing site. The received signal includes a microwave carrier, whereas the processing compensates the received microwave signal for degradation due to propagation between the preceding site and the processing site. The method further comprises the step (B) of conditioning the received microwave signal for subsequent transmission from the processing site to a subsequent site.

17 Claims, 6 Drawing Sheets

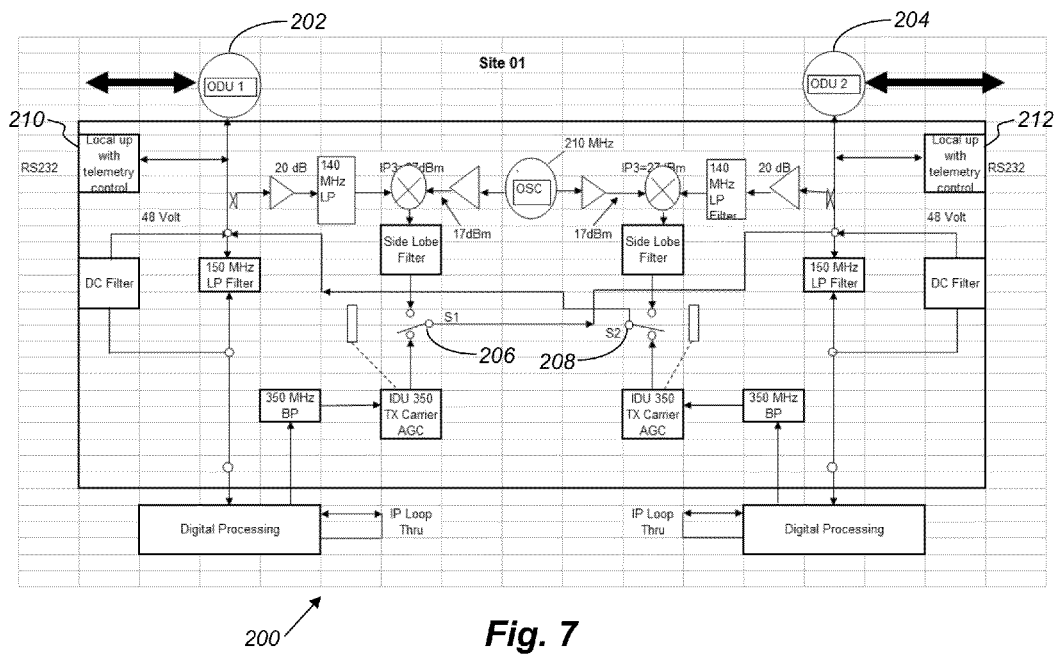
Fig. 7
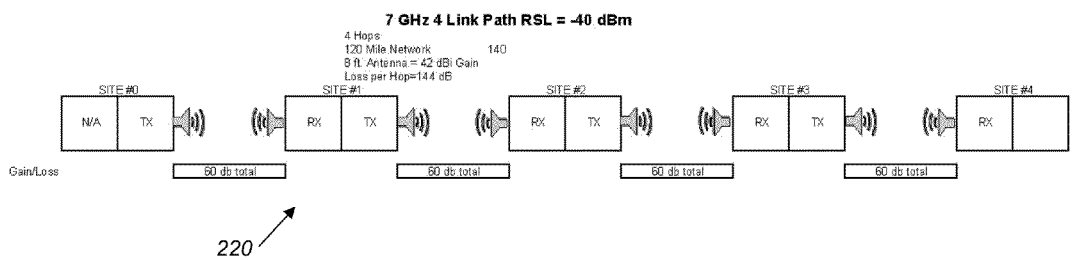
Fig. 8 This is a four link repeater design. These 7 GHz links use 8 ft antenna with 42 dB gain. The path loss for 30 miles is 60- dB.

TRANSMISSION SYSTEM OF DIGITAL RADIO INFORMATION USING REPEATERS WHILE MINIMIZING DATA TRANSFER LATENCY

TECHNICAL FIELD

The technology relates to the field of Transmission of Digital information and more specifically to the field of Transmission of Digital information with low latency.

BACKGROUND

In recent years, a combination of regulatory reforms, market structure evolution and technology innovation have combined to create a new paradigm for the global financial trading markets; one in which the speed at which transactions can be executed is fundamental to the success of market participants.

Put simply, for such a participant—be it an exchange operator, a broker or a trading firm—to win in the new electronic marketplace of complex algorithmic and high-frequency trading (HFT), they have to be faster than their competition. And the margin that separates the winners from the losers is now measured in microseconds, with nanoseconds not too far off.

Within the Information Technology (IT) platforms upon which financial trading systems run, the speed at which data can be processed and exchanged between components directly affects the efficiency and overall speed of those systems. And the phenomenon that limits this speed is known as latency. Minimizing latency—to a point where it is close to eradicated—is the design goal for these platforms.

But it is a design goal that is very challenging to meet. Latency is introduced by every component of the platform, be it the microprocessors, memory and I/O buses that make up servers, the network interfaces and cabling that form local data fabrics, the fiber optics that connect geographically dispersed processing endpoints. Latency is also introduced by the processing involved in executing the trading application logic itself.

Thus, the overall latency of an IT platform is the sum of many contributors, including the vital messaging function or layer that binds the servers and networks—and the application logic—together.

The present patent application discloses a novel technology configured to extend the path length for transmission of digital radio information using repeaters while minimizing data transfer latency.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method for transmission a set of digital data is provided. The method comprises: (A) processing a received signal transmitted from a preceding site by at least one repeater located in a repeater hub in a processing site. The received signal includes a microwave carrier, whereas the processing compensates the received microwave signal for degradation due to propagation between the preceding site and the processing site.

The method further comprises the step (B) of conditioning the received microwave signal for subsequent transmission from the processing site to a subsequent site.

DESCRIPTION OF THE DRAWINGS

The accompanying drawings, which are incorporated in and form a part of this specification, illustrate embodiments of the technology and, together with the description, serve to explain the principles below:

FIG. 7 shows a full duplex system for the purposes of the present technology.

FIG. 8 is a block diagram of a four link repeater design for the purposes of the present technology.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
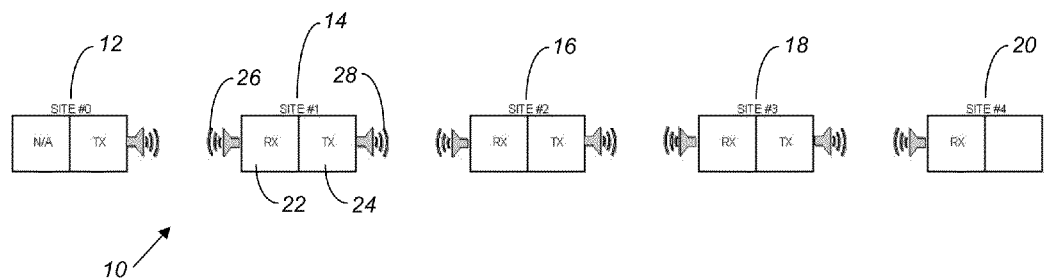
FIG. 1 illustrates a block diagram of an apparatus of the present technology including a plurality of repeaters configured to compensate the microwave signal used for transmission of data between a source site and a destination site for free space losses due to propagation of the microwave signal between these sites.

In an embodiment of the present technology, as shown in the apparatus 10 of FIG. 1, the several repeaters are cascaded to overcome the detrimental effects of free space losses over extremely long distances.

In an embodiment of the present technology, more specifically, the above diagram 10 of FIG. 1 shows that the source site for the data to be transmitted is located at site #0 (12).

In an embodiment of the present technology, more specifically, the above diagram 10 of FIG. 1 shows that the destination site for the transmitted data is located at site #4 (20). Repeaters are identified at sites/hubs #1 (14), #2 (16), and #3 (18) but not limited in number. Free space losses between each of the sites/hubs result in degradation of signal-to-noise ratio (SNR) that creates transmission errors. The degradation of the carrier microwave signal is caused by the loss of amplitude of the microwave signal, and/or by frequency/phase dispersion of the microwave signal.

In an embodiment of the present technology, the apparatus 10 (of FIG. 1) is configured to minimize the transmission delay through the network for critical time dependent applications.

In an embodiment of the present technology, the received microwave signal is processed at each hub and then conditioned for re-transmission to the next hub in the network. Signal processing within the hubs is normally not performed at the Carrier Frequency because of the expense of components.

In an embodiment of the present technology, more specifically, the received microwave signal is down converted to a lower frequency F1 in the Receiver (Rx) component (22 of FIG. 1) of the repeater (14 of FIG. 1). The down converted to F1 microwave signal is manipulated (Filtered and Level Restoration) and subsequently up converted to F2 frequency for re-transmission.

In an embodiment of the present technology, more specifically, the processed microwave signal is further processed at frequency F2 at the Transmitter (Tx) component (24 of FIG. 1) of the repeater 14 (of FIG. 1) for further conditioning and for re-transmission to the next repeater hub 16.

In an embodiment of the present technology, at least one repeater (14, 16, or 18) comprises an Intermediate Frequency (IF) Pass Through (Analog) repeater, or a Digital processing repeater (please, see discussion below).

In an embodiment of the present technology, at least one Digital processing repeater further comprises a digital filter (please, see discussion below). The digital filter repeater can be provided by commercially available Indoor Units (IDUs) from many equipment providers.

In an embodiment of the present technology, at least one Digital processing repeater further comprises a full modem digital reconstruction repeater (please, see discussion below). In this embodiment of the present technology, the Rx component of the repeater manipulates the microwave signal at F1 frequency: converts to digital data, disassembles the data packets into elements such as data, and performs forward correction information and network management (In-band Signal Processing). After performing data manipulation, the Tx component of the repeater transmitter up converts microwave signal at F2 for re-transmission to the next hub. The digital reconstruction repeater can be provided by commercially available Indoor Units (IDUs) from many equipment providers.

Figure 2:
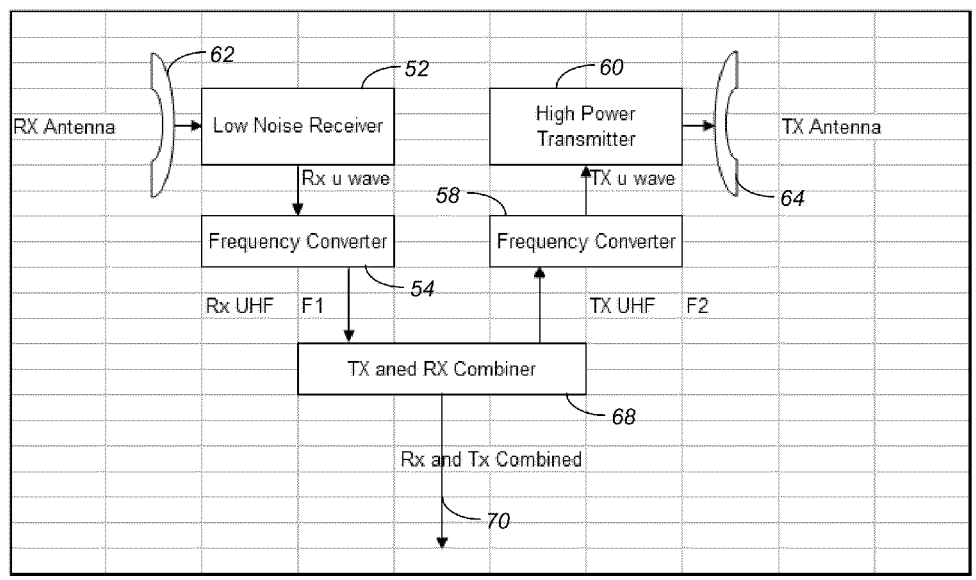
FIG. 2 depicts a block diagram of an Outdoor Unit (ODU) of a microwave transmission system comprising a receiver, a transmitter and frequency converters for the purposes of the present technology.

In an embodiment of the present technology, FIG. 2 depicts a block diagram of an Outdoor Unit (ODU) 50 of a Transceiver comprising a Receiver (Rx) sub block and a Transmitter (Tx) sub block. In this embodiment of the present technology, the microwave Outdoor Unit (ODU) is separated from the Indoor Unit (IDU)) processing unit.

In an embodiment of the present technology, the Receiver Rx sub block further comprises an Rx antenna 62 and a low noise receiver 52 configured to receive a microwave signal transmitted from the preceding site, and a frequency down converter 54 configured to down convert the received microwave signal to the first lower intermediate frequency F1.

In an embodiment of the present technology, the Transmitter Rx sub block further comprises a frequency up converter 58 configured to up convert the down converted F1 microwave signal to the second intermediate frequency F2, a high power transmitter 60, and transmitter antenna Tx antenna 64 configured to transmit the microwave signal to the next site.

In an embodiment of the present technology, to facilitate the separation of the microwave Outdoor Unit (ODU) components, (which are commonly collocated along with the antenna on towers or roof tops), from the Modem and Digital processing, (commonly located at ground level and referred to as Indoor Unit (IDU)), a combiner block 68 and a single coaxial cable 70 could be used to interconnect the two subsystems: Outdoor Unit (ODU) and Indoor Unit (IDU), as shown in FIG. 2. Transport of the Transmitter and Receiver signals between the separated assemblies, ODU and IDU, is also aided by reducing the microwave carrier frequencies to lower values to minimize the signal losses on the cable.

Figure 3:
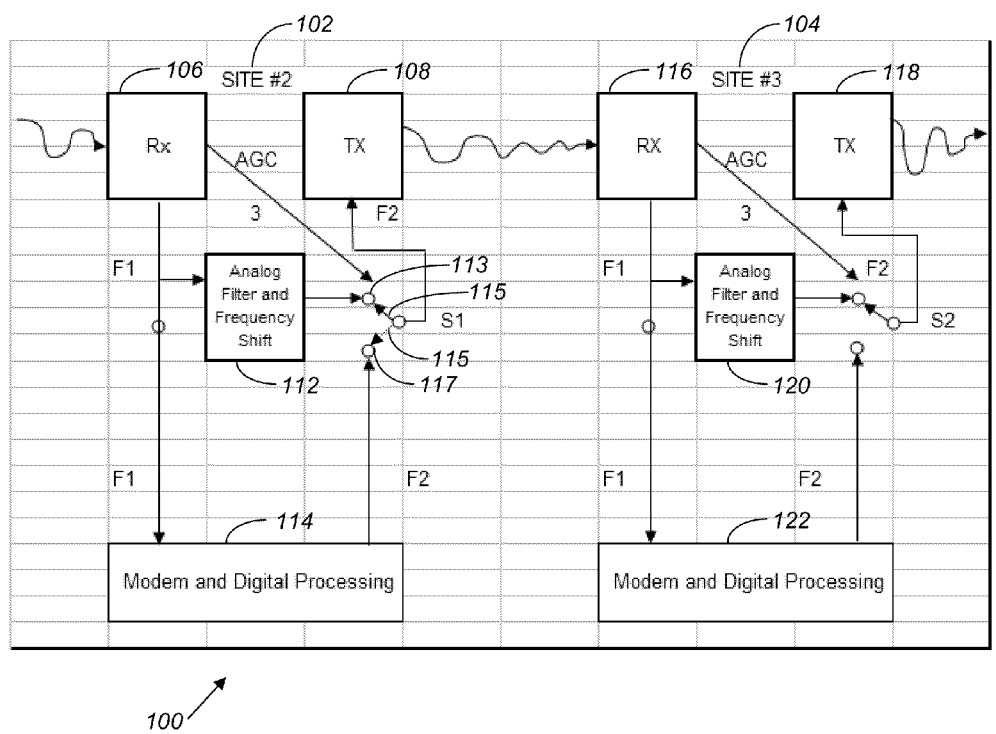
FIG. 3 is a block diagram of the present technology of two neighboring sites, whereas at each site the microwave circuits (Outdoor Units) reside at the same location as the Modem/Digital (Indoor Units).

In an embodiment of the present technology, FIG. 3 depicts a block diagram 100 of two neighboring sites—site #2 102 and site #3 104.
In each site an Outdoor Unit (ODU) and Indoor Unit (IDU) are residing at the same location. In this embodiment, whereas the Microwave circuits (ODU) reside at the same location as the Modem/Digital (IDU) there is no need to combine F1 and F2 for transport on a single cable.

In an embodiment of the present technology, more specifically, site #2 102 comprises a receiver block 106 Rx, a transmitter block 108 Tx, analog filter and frequency shift block 112, and a modem and digital processing block 114.

In an embodiment of the present technology, more specifically, site #3 104 comprises a receiver block 116 Rx, a transmitter block 118 Tx, analog filter and frequency shift block 120, and a modem and digital processing block 122.

The primary function for a repeater is to process the received signal emanating from the previous site and to condition it for further transmission to the next repeater. Processing restores the loss of signal level due to path attenuation and filters all but the wanted spectrum.

In an embodiment of the present technology, the three following methods are used to minimize latency: analog filtering, digital filtering, and digital reconstruction, as shown in Table I.

TABLE I

Comparative Latency Delay

| Type | Latency | Line Limit correction | FEC | Signal to Noise fix | In-Band NMS |
|---|---|---|---|---|---|
| Analog Filter | <1 μsec | Use of Analog Filter | NO | NO | NO |
| Digital Filter | <10 μsec | Use if Digital Filter control from Modem | NO | Yes | NO |
| Digital Reconstruction | <30 μsec | Modem implementation | YES | YES | Yes |

In an embodiment of the present technology, the ratio of analog and digital hubs throughout the network is not fixed but is dynamic depending on the quality of the various path segments.

In an embodiment of the present technology, for a given network it is preferred to employ analog techniques for the benefit of reduced latency. However, after propagating through several analog hubs the quality of a microwave signal degrades below an acceptable critical level. At this point the further immediate use of analog hug is not feasible until the microwave signal is restored above the acceptable critical level.

It follows, that for a given network, to maintain the optimum minimum latency there are optimally several analog hubs followed by a digital hub configured to correct the accumulated unacceptable degradation level of the microwave signal caused by the cascading too many subsequent analog hubs.

In an embodiment of the present technology, more specifically, the analog processing is the preferred mode. However, the analog preferred mode of processing is substituted by a digital processing mode (a digital filtering or a digital reconstruction) if the Automatic Gain Control (AGC) voltage derived from the Outdoor Unit (ODU) reaches a critical value which indicates that the noise floor reaches a level that will most probably corrupt the re-transmission to the next hub.

In an embodiment of the present technology, the Modem and Digital Processing circuits can also be used to monitor the quality of the Receiver signal (RSL). Thus, the Modem and Digital Processing circuits can be used to enable the switch away from the initially deployed analog mode.

In an embodiment of the present technology, more specifically, the Modem and Digital Processing Circuits are employed to substantially continuously monitor the quality of the Hub received signal at F1 frequency. When the Analog mode can't sustain a quality re-transmission, the Analog mode is replaced by the Digital Filter mode or by the Modem Digital Reconstruction mode.

In an embodiment of the present technology, for site 102 of FIG. 3 (the similar reasoning is applicable to site 104), the Analog processing mode with minimum latency is initially engaged and is introduced with the switch 115 in the position S1 113, whereas the Analog Filter 112 is used to enable the processing. In this embodiment, the down converted signal at F1 is up converted to (F2) by simple analog frequency conversion. This processing provides minimum of latency of less than 2 μsec per site. The primary disadvantages of this analog processing mode are in maintaining conformance to the Agency Spectrum Mask requirements. As the Receiver signal (RSL) is reduced, due to transmission path attenuation created by atmospheric conditions, the re-transmission of the increased noise floor can reach a level where it can break the Agency Spectrum Mask. To minimize this effect a special High Quality (HiQ) filter (not shown) is employed which is transparent to the wanted spectrum while rejecting the noise energy that would break the spectrum mask prior to re-transmission to the next Hub in the network.

In an embodiment of the present technology, for site 102 (the similar reasoning is applied to site 104); the digital filtering mode is deployed by changing the switch 115 to the position 117. In this embodiment, the degraded receive spectrum F1 is converted to a digital format, shifted in frequency, and then converted to an analog signal F2 for re-transmission to the next Hub. The advantage of the Digital Filtering is that the spectrum meets the Agency Mask requirements by suppressing the Noise Floor. The disadvantage of Digital filtering is increased latency as compared to the latency corresponding to the analog mode (please, see Table I). The digital filtering block 114 of FIG. 3 can be implemented by a dedicated circuit or by a subset firmware in the Indoor Unit (IDU).

In an embodiment of the present technology, for site 102 (the similar reasoning is applied to site 104), the Digital Reconstruction mode is deployed to restore the degraded microwave signal for further retransmission to the next hub by changing the switch 115 to the position 117. In this embodiment of the present technology, the received microwave signal, which contains the multiplexed data encoded in a modulated spectrum, is processed by digital methods which extracts the data, corrects for accumulated Bit/Byte errors and then reassembles this all data back into a modulated spectrum for re-transmission to the next hub. This sequence corrects for path degradation and re-establishes the carrier to noise for the next leg of the network but at cost of further increase of latency (please, see Table I).

There are various monitoring methods of the received signal that can be used to determine which type of processing has the best advantage at the current degradation level of the received signal. For Automatic gain control voltage (AGC), Means Squared Error (MSE), and Bit/Packet Error rate are the criteria parameters that can be monitored, measured and used for selection of one of the three processes.

In estimation theory and decision theory, a Bayes estimator or a Bayes action is an estimator or decision rule that minimizes the posterior expected value of a loss function (i.e., the posterior expected loss). Equivalently, it maximizes the posterior expectation of a utility function. An alternative way of formulating an estimator within Bayesian statistics is Maximum a posteriori estimation.

Suppose an unknown parameter θ is known to have a prior distribution π. Let $$\delta = \delta(\chi) \quad \text{(Eq. 1)}$$

be an estimator of θ (based on some measurements x), and let $$L(\theta, \delta) \quad \text{(Eq. 2)}$$

be a loss function, such as squared error. The Bayes risk of δ is defined as $$E_\pi\{L(\theta,\delta)\} \quad \text{(Eq. 3)}$$

where the expectation is taken over the probability distribution of θ: this defines the risk function as a function of δ. An estimator δ is said to be a Bayes estimator if it minimizes the Bayes risk among all estimators.

Equivalently, the estimator which minimizes the posterior expected loss $$E\{L(\theta,\delta)|\chi\} \quad \text{(Eq. 4)}$$

for each x also minimizes the Bayes risk and therefore is a Bayes estimator.

If the prior is improper then an estimator which minimizes the posterior expected loss for each x is called a generalized Bayes estimator.

The most common risk function used for Bayesian estimation is the mean square error (MSE), also called squared error risk. The MSE is defined by $$MSE = E[(\hat{\theta}(\chi) - \theta)^2] \quad \text{(Eq. 5)}$$

where the expectation is taken over the joint distribution of θ and χ.

In digital transmission, the number of bit errors is the number of received bits of a data stream over a communication channel that have been altered due to noise, interference, distortion or bit synchronization errors. The bit error rate or bit error ratio (BER) is the number of bit errors divided by the total number of transferred bits during a studied time interval. BER is a unit less performance measure, often expressed as a percentage.

The bit error probability $p_e$ is the expectation value of the BER. The BER can be considered as an approximate estimate of the bit error probability. This estimate is accurate for a long time interval and a high number of bit errors.

As an example, assume this transmitted bit sequence: 0 1 1 0 0 0 1 0 1 1, and the following received bit sequence: 0 0 1 0

1 0 1 0 0 1. The number of bit errors (the underlined bits) is in this case 3. The BER is 3 incorrect bits divided by 10 transferred bits, resulting in a BER of 0.3 or 30%.

The packet error rate (PER) is the number of incorrectly received data packets divided by the total number of received packets. A packet is declared incorrect if at least one bit is erroneous. The expectation value of the PER is denoted packet error probability $p_p$, which for a data packet length of N bits can be expressed as $$p_p = 1 - (1-p_e)^N \quad \text{(Eq. 6)}$$

It is assumed for the purposes of the further discussion that the bit errors are independent of each other. Therefore, for small bit error probabilities, the (Eq. 6) for packet error probability $p_p$, can be approximated by:

$$p_p \approx p_e N \quad \text{(Eq. 7)}$$

Similar measurements can be carried out for the transmission of frames, blocks, or symbols.

In a communication system, the receiver side BER may be affected by transmission channel noise, interference, distortion, bit synchronization problems, attenuation, wireless multipath fading, etc.

In telecommunications, the carrier-to-noise ratio, often written CNR or C/N, is the signal-to-noise ratio (SNR) of a modulated signal. The term is used to distinguish the CNR of the radio frequency pass band signal from the SNR of an analogue base band message signal after demodulation, for example an audio frequency analogue message signal.

Digitally modulated signals (e.g. QAM or PSK) are basically made of two CW carriers (the I and Q components, which are out-of-phase carriers) In fact, the information (bits or symbols) is carried by given combinations of phase and/or amplitude of the I and Q components. It is for this reason that, in the context of digital modulations, digitally modulated signals is usually referred to as carriers. Therefore, the term carrier-to-noise-ratio (CNR), instead of signal-to-noise-ratio (SNR) is preferred to express the signal quality when the signal has been digitally modulated.

High C/N ratios provide good quality of reception, for example low bit error rate (BER) of a digital message signal, or high SNR of an analogue message signal.

In an embodiment of the present technology, to assure the minimum network latency the maximum use of analog hubs should be deployed. At each hub F1 is monitored by its assigned signal processor.

In an embodiment of the present technology, the receiver carrier-to-noise ratio (C/N), and Constellation Means Squared Error (MSE) are also monitored.

In an embodiment of the present technology, when the hub receiver level input diminishes to a threshold point and the modem calculates that it can no longer sustain a satisfactory spectrum, a switching command is issued to convert the degraded hub from the analog mode to either the digital filter mode or the digital reconstruction mode.

Figure 4:
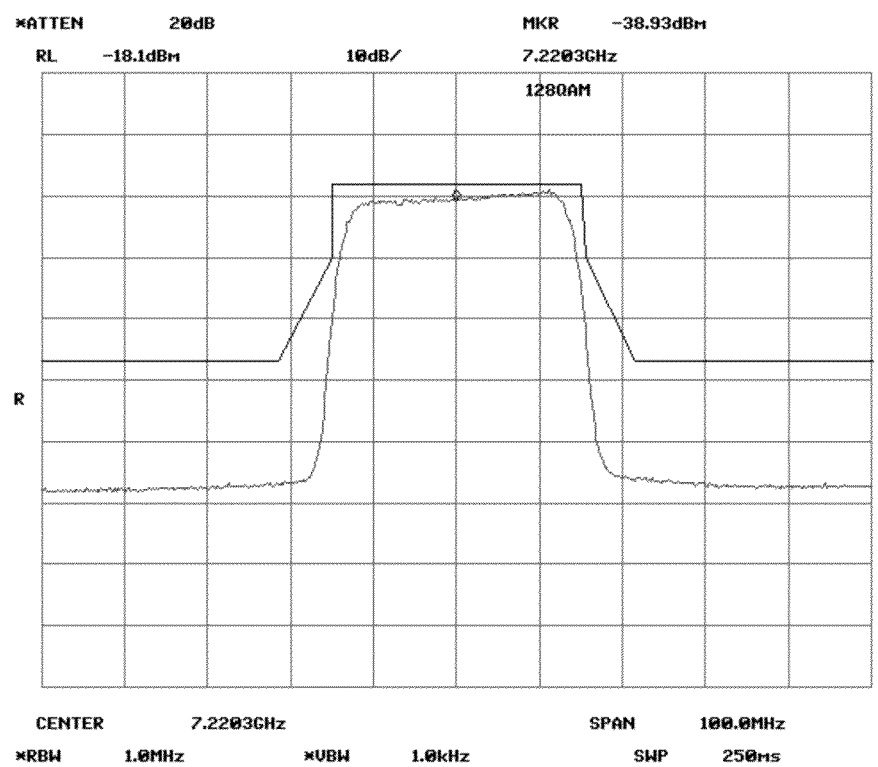
FIG. 4 is an illustration of the spectrum performance from a hub using Digital techniques for the purposes of the present technology.

In an embodiment of the present technology, FIG. 4 is an illustration 140 of the spectrum performance from a hub using Digital techniques.

Figure 5:
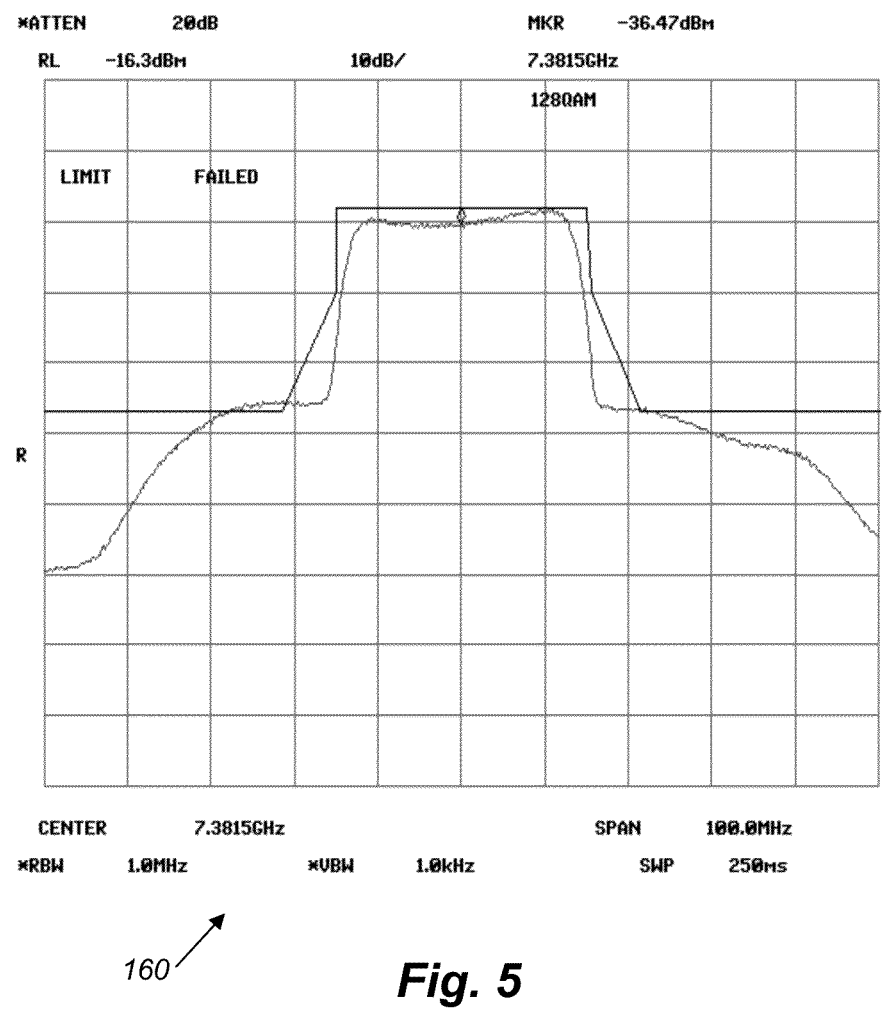
FIG. 5 is an illustration of a transmitter spectrum (F2) which has been derived from a received signal at −70 dBm without the use of an Analog filter for the purposes of the present technology.

In an embodiment of the present technology, FIG. 5 is an illustration 160 of a transmitter spectrum (F2) which has been derived from a received signal at −70 dBm without the use of an Analog filter.

Figure 6:
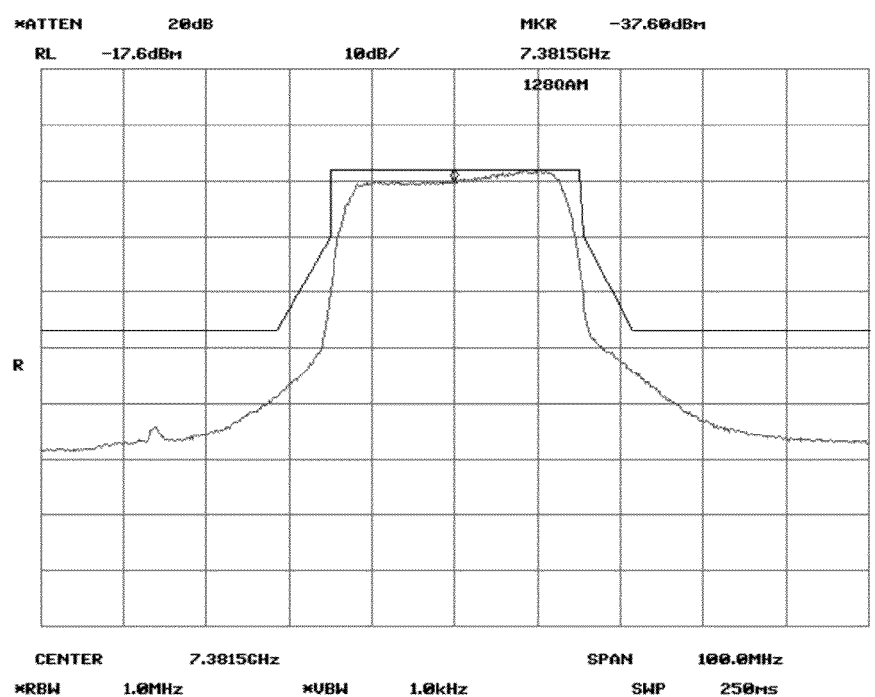
FIG. 6 is an illustration of a transmitter spectrum (F2) after using Analog side-band filter for the purposes of the present technology.

In an embodiment of the present technology, FIG. 6 is an illustration 180 of a transmitter spectrum (F2) after using Analog side-band filter. The performance of this filter is critical, it should not produce spectrum tilt; and it should have low group delay throughout the power spectrum. This filter can be constructed using High-Q inductance and capacitance elements.

Commercial Helical resonators, Ceramic Resonators, and other technologies which maintain Group Delay and Amplitude Flatness can be used to assure spectrum quality. For Digital Filter modes the analog filtering is not required as the Digital Processing generates optimum spectrum shape and power spectrum linearity.

In an embodiment of the present technology, the received signal at each Hub sites is continuously monitored by a modem which calculates C/N (Carrier-To-Noise) or MSE (Constellation Means Squared Error). In the Analog mode, whereas the switch 115 of FIG. 3 is in position 113, the receiver spectrum (F1) is filtered and up converted to F2 for forwarding to the next transmitter in the network. The Analog mode is maintained as long as the Modem Digital Processing (Indoor Unit) has determined that the quality of the C/N and MSE signal is satisfactory.

In an embodiment of the present technology, if the Indoor Unit Modem calculations determine that the signal is degraded to the extent which would result in Network errors or nonconforming spectrum, the switch 115 of FIG. 3 is switched into position 117 to select the digitally reconstruction mode, whereas the spectrum of the received microwave signal is upgraded (the noise floor is re-established, the spectrum constellation is corrected, and Byte and Error problems are corrected by using Forward Error Correction (FEC) algorithms) at the expense of increased latency. The Digital Reconstruction mode will continue until the C/N and MSE improves to a level at which the Analog mode can operate without contributing to the Network degradation.

In an embodiment of the present technology, the automatic-gain-control (AGC) techniques are used to control the mode switch 115 (of FIG. 3). AGC analog voltage is scaled for a predicable threshold error rate performance and spectrum compliance. Switching between Analog and Digital Filter modes is performed by firmware between non critical packets intervals so data is not lost during the mode transition process.

In an embodiment of the present technology, FIG. 7 shows a full duplex system 200 for the purposes of the present technology. For example, Rx IF is selected at 140 MHz, and the TX IF is selected at 350 MHz The IF signals at 140 MHz and 350 MHz respectively are not fixed but can be flexible for different ODU requirements. Receiver spectrum (F1) at output of the ODU #1 202 is converted to the Transmitter IF (F2) by using an Analog Mode and is coupled to the Transmitter located in ODU #2 204. This arrangement will allow the Transmitter and Receivers Carrier frequencies to be programmed in the ODUs while maintaining fixed IF.

In an embodiment of the present technology, the signal path for Analog operation is as follows: ODU#1 202 Receiver IF coupled out by a coupler, amplified, filtered by a Low-Pass to remove up-ling 350 MHz Modem spectrum, mixed up to 350 MHz, filtered by critical side-lobe filter, applied to Analog/Digital selection switch S1 206, and then delivered to ODU #2 204. For the return direction of the network the path is similar and uses a common 210 MHz local oscillator. ODU #1 202 and ODU #2 204 are placed in separate enclosures to facilitate each hop and are attached to antennae that enable the hops to be aimed at different directions if required.

In an embodiment of the present technology, the function of the switch S1 06 is to select the mode of operation for the direct transmission from 202 to 204. For the reverse transmission from 204 to 202 the same function is realized by the switch S2 208.

In an embodiment of the present technology, an optional control of the Outdoor Unit (ODU) configuration can also be performed by a local Microprocessor using a RS232 interface 210 (212). The RS232 interface used for command and monitor functions can be supplied from distant control center using scrambled cell phone connections.

FIG. 8 is a block diagram 200 of a four link repeater design used for testing the present technology. The measured performance of this system is illustrated in Table II.

TABLE II

| Low latency MSE versus error rate | | | |
| --- | --- | --- | --- |
| QAM Constellation type | 256 QAM | 128 QAM | 56 QAM |
| Min MSE for error rate of $10^{-6}$ | 31 | 29 | 27 |

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for transmission a set of digital data comprising:
 (A) processing a received signal transmitted from a preceding site by at least one repeater located in a repeater hub in a processing site; said received signal having a microwave carrier; wherein said processing compensates said received microwave signal for degradation due to propagation between said preceding site and said processing site;
 (A1) down converting said received signal having said microwave carrier frequency from said received microwave frequency to a first intermediate frequency;
 (A1, 1) processing said down converted signal having said first intermediate frequency by using a processing mode selected from the group consisting of: an analog mode having a minimum latency; and a digital mode;
 (A1, 2) processing said down converted signal having said first intermediate frequency by using said digital processing mode selected from the group consisting of: a digital filter mode having an intermediate latency; and a digital reconstruction mode having a maximum latency; and
 (B) conditioning said received microwave signal for subsequent transmission from said processing site to a subsequent site.

2. A method for transmission a set of digital data comprising:
 (A) processing a received signal transmitted from a preceding site by at least one repeater located in a repeater hub in a processing site; said received signal having a microwave carrier; wherein said processing compensates said received microwave signal for degradation due to propagation between said preceding site and said processing site;
 (A1) down converting said received signal having said microwave carrier frequency from said received microwave frequency to a first intermediate frequency;
 (A1, 1) processing said down converted signal having said first intermediate frequency by using a processing mode selected from the group consisting of: an analog mode having a minimum latency; and a digital mode;
 (A1, 4) automatically switching between said analog and digital processing modes in at least one said repeater hub at a timing point at which a noise floor of said received signal (RSL) has reached a critical noise level; wherein said received signal (RSL) having said critical noise level is processed by using a digital processing mode; and
 (B) conditioning said received microwave signal for subsequent transmission from said processing site to a subsequent site.

3. A method for transmission a set of digital data comprising:
 (A) processing a received signal transmitted from a preceding site by at least one repeater located in a repeater hub in a processing site; said received signal having a microwave carrier; wherein said processing compensates said received microwave signal for degradation due to propagation between said preceding site and said processing site;
 (A1) down converting said received signal having said microwave carrier frequency from said received microwave frequency to a first intermediate frequency;
 (A1, 1) processing said down converted signal having said first intermediate frequency by using a processing mode selected from the group consisting of: an analog mode having a minimum latency; and a digital mode;

(A1, 5) using an AGC method to select said analog processing mode having said minimum latency; wherein said analog mode is replaced by a digital mode if an AGC voltage derived from said Outdoor Unit (ODU) reaches a critical value;

and (B) conditioning said received microwave signal for subsequent transmission from said processing site to a subsequent site.

4. A method for transmission a set of digital data comprising:

(A) processing a received signal transmitted from a preceding site by at least one repeater located in a repeater hub in a processing site; said received signal having a microwave carrier; wherein said processing compensates said received microwave signal for degradation due to propagation between said preceding site and said processing site;

(A1) down converting said received signal having said microwave carrier frequency from said received microwave frequency to a first intermediate frequency;

(A1, 1) processing said down converted signal having said first intermediate frequency by using a processing mode selected from the group consisting of: an analog mode having a minimum latency; and a digital mode;

(A1, 6) using an Indoor Unit (IDU) signal processing unit to select said digital filter processing mode having an intermediate latency by measuring a Means Squared Error (MSE) parameter;

and (B) conditioning said received microwave signal for subsequent transmission from said processing site to a subsequent site.

5. A method for transmission a set of digital data comprising:

(A) processing a received signal transmitted from a preceding site by at least one repeater located in a repeater hub in a processing site; said received signal having a microwave carrier; wherein said processing compensates said received microwave signal for degradation due to propagation between said preceding site and said processing site;

(A1) down converting said received signal having said microwave carrier frequency from said received microwave frequency to a first intermediate frequency;

(A1, 1) processing said down converted signal having said first intermediate frequency by using a processing mode selected from the group consisting of: an analog mode having a minimum latency; and a digital mode;

(A1, 7) using an Indoor Unit (IDU) signal processing unit to select said digital reconstruction processing mode having a maximum latency by measuring a Bit/Packet Error parameter;

and (B) conditioning said received microwave signal for subsequent transmission from said processing site to a subsequent site.

6. A method for transmission a set of digital data comprising:

(A) processing a received signal transmitted from a preceding site by at least one repeater located in a repeater hub in a processing site; said received signal having a microwave carrier; wherein said processing compensates said received microwave signal for degradation due to propagation between said preceding site and said processing site;

(A1) down converting said received signal having said microwave carrier frequency from said received microwave frequency to a first intermediate frequency;

(A1, 1) processing said down converted signal having said first intermediate frequency by using a processing mode selected from the group consisting of: an analog mode having a minimum latency; and a digital mode;

(A1, 8) monitoring at least one parameter of said down converted microwave signal having a first intermediate frequency by an assigned Indoor Signal Processing unit (IDU); wherein said parameter is selected from the group consisting of: Carrier-to-Noise (C/N); a Constellation Mean Squared Error (MSE); and a Packet/Bit error;

and (B) conditioning said received microwave signal for subsequent transmission from said processing site to a subsequent site.

7. The method of claim 6; wherein said step (A1, 8) further comprises:

(A1, 8, 1) if said at least one parameter is within the predetermined range, selecting said analog processing mode and performing an analog filtering and level restoration of said of down converted microwave signal having said first intermediate frequency and converting said filtered and having restored level signal having said first intermediate frequency to a second intermediate frequency for forwarding to a transmitter.

8. The method of claim 6; wherein said step (A1, 8) further comprises:

(A1, 8, 2) if said at least one parameter is outside said predetermined range, selecting a digital processing mode to digitally correct a degraded received signal.

9. The method of claim 6; wherein said step (A1, 8) further comprises:

(A1, 8, 3) if said degraded received signal is digitally corrected; switching said repeater from said digital processing mode back into said analog processing mode having said minimum latency.

10. An apparatus for transmission a set of digital data between at least two sites comprising:

(A) a means for processing a received signal transmitted from a preceding site by at least one repeater located in a repeater hub in a processing site; said received signal having a microwave carrier; wherein said processing compensates said received microwave signal for degradation due to propagation between said preceding site and said processing site; said degradation caused by loss of amplitude of said microwave signal, or by frequency/phase dispersion of said microwave signal; wherein said means (A) further comprises:

(A2) a digital down converter configured to down convert said received signal having said microwave carrier frequency to a first lower intermediate frequency; wherein said digital down-converter block is selected from the group consisting of: a digital filter block having an intermediate latency; and a digital reconstruction block having a maximum latency;

and (B) a means for conditioning said received microwave signal for subsequent transmission from said processing site to a subsequent site.

11. An apparatus for transmission a set of digital data between at least two sites comprising:
- (A) a means for processing a received signal transmitted from a preceding site by at least one repeater located in a repeater hub in a processing site; said received signal having a microwave carrier; wherein said processing compensates said received microwave signal for degradation due to propagation between said preceding site and said processing site; said degradation caused by loss of amplitude of said microwave signal, or by frequency/phase dispersion of said microwave signal; wherein said means (A) further comprises:
- (A4) a switching block configured to automatically switch between an analog and a digital processing modes in at least one said repeater hub depending on whether a noise floor of said received signal (RSL) has reached a critical level; wherein said received signal (RSL) having said critical noise level is processed by using a digital processing mode;

and
- (B) a means for conditioning said received microwave signal for subsequent transmission from said processing site to a subsequent site.

12. An apparatus for transmission a set of digital data between at least two sites comprising:
- (A) a means for processing a received signal transmitted from a preceding site by at least one repeater located in a repeater hub in a processing site; said received signal having a microwave carrier; wherein said processing compensates said received microwave signal for degradation due to propagation between said preceding site and said processing site; said degradation caused by loss of amplitude of said microwave signal, or by frequency/phase dispersion of said microwave signal; wherein said means (A) further comprises:
- (A5) an Automatic Gain Control (AGC) block configured to select an analog processing mode having a minimum latency by measuring a Means Squared Error (MSE) parameter;

and
- (B) a means for conditioning said received microwave signal for subsequent transmission from said processing site to a subsequent site.

13. An apparatus for transmission a set of digital data between at least two sites comprising:
- (A) a means for processing a received signal transmitted from a preceding site by at least one repeater located in a repeater hub in a processing site; said received signal having a microwave carrier; wherein said processing compensates said received microwave signal for degradation due to propagation between said preceding site and said processing site; said degradation caused by loss of amplitude of said microwave signal, or by frequency/phase dispersion of said microwave signal; wherein said means (A) further comprises:
- (A6) an Indoor Unit (IDU) configured to select a digital filter processing mode having an intermediate latency by measuring a Means Squared Error (MSE) parameter;

and
- (B) a means for conditioning said received microwave signal for subsequent transmission from said processing site to a subsequent site.

14. An apparatus for transmission a set of digital data between at least two sites comprising:
- (A) a means for processing a received signal transmitted from a preceding site by at least one repeater located in a repeater hub in a processing site; said received signal having a microwave carrier; wherein said processing compensates said received microwave signal for degradation due to propagation between said preceding site and said processing site; said degradation caused by loss of amplitude of said microwave signal, or by frequency/phase dispersion of said microwave signal; wherein said means (A) further comprises:
- (A7) an Indoor Unit (IDU) configured to select a digital reconstruction processing mode having a maximum latency by measuring a Means Squared Error (MSE) parameter;

and
- (B) a means for conditioning said received microwave signal for subsequent transmission from said processing site to a subsequent site.

15. An apparatus for transmission a set of digital data between at least two sites comprising:
- (A) a means for processing a received signal transmitted from a preceding site by at least one repeater located in a repeater hub in a processing site; said received signal having a microwave carrier; wherein said processing compensates said received microwave signal for degradation due to propagation between said preceding site and said processing site; said degradation caused by loss of amplitude of said microwave signal, or by frequency/phase dispersion of said microwave signal; wherein said means (A) further comprises:
- (A8) an Indoor Unit (IDU) configured to monitor at least one parameter of said down converted signal having said first intermediate frequency; wherein said at least one parameter is selected from the group consisting of: Carrier-to-Noise (C/N); a Constellation Mean Squared Error (MSE); and a Packet/Bit error;

and
- (B) a means for conditioning said received microwave signal for subsequent transmission from said processing site to a subsequent site.

16. An apparatus for transmission a set of digital data between at least two sites comprising:
- (A) a means for processing a received signal transmitted from a preceding site by at least one repeater located in a repeater hub in a processing site; said received signal having a microwave carrier; wherein said processing compensates said received microwave signal for degradation due to propagation between said preceding site and said processing site; said degradation caused by loss of amplitude of said microwave signal, or by frequency/phase dispersion of said microwave signal; wherein an analog processing block is selected; and wherein said means (A) further comprises:
- (A10) a converter block configured to convert said filtered and having restored level signal having said first intermediate frequency to a second intermediate frequency for forwarding to a transmitter;

and
- (B) a means for conditioning said received microwave signal for subsequent transmission from said processing site to a subsequent site.

17. An apparatus for transmission a set of digital data between at least two sites comprising:
- (A) a means for processing a received signal transmitted from a preceding site by at least one repeater located in a repeater hub in a processing site; said received signal having a microwave carrier; wherein said processing compensates said received microwave signal for degradation due to propagation between said preceding site and said processing site; said degradation caused by loss of amplitude of said microwave signal, or by frequency/phase dispersion of said microwave signal; wherein a digital processing block is selected; and wherein said means (A) further comprises:

(A11) a digital processing block configured to digitally correct a degraded received signal;

and (B) a means for conditioning said received microwave signal for subsequent transmission from said processing site to a subsequent site.

* * * * *